(12) United States Patent
Leduc et al.

(10) Patent No.: US 6,681,016 B1
(45) Date of Patent: Jan. 20, 2004

(54) SYSTEM FOR TRANSFER OF SECURE MISSION DATA

(75) Inventors: Robert G. Leduc, Dighton, MA (US); John C. Gregson, Portsmouth, RI (US); Bradford M. Raymond, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/337,161

(22) Filed: Jun. 11, 1999

(51) Int. Cl.$^7$ .............................. H04L 9/12; G09C 5/00
(52) U.S. Cl. ....................................... 380/266; 380/257
(58) Field of Search ................................. 380/266, 255, 380/257, 243; 342/367

(56) References Cited

U.S. PATENT DOCUMENTS

| | | | | |
|---|---|---|---|---|
| 5,166,977 A | * | 11/1992 | Ross ........................... | 380/243 |
| 5,724,414 A | * | 3/1998 | Dimolitsas et al. .... | 379/100.17 |
| 6,147,774 A | * | 11/2000 | Hamadani et al. .......... | 358/442 |
| 6,240,074 B1 | * | 5/2001 | Chandos et al. ............ | 370/321 |
| 6,418,204 B1 | * | 7/2002 | McHugh et al. ......... | 379/93.02 |

* cited by examiner

Primary Examiner—Matthew Smithers
(74) Attorney, Agent, or Firm—James M. Kasischke; Jean-Paul A. Nasser; Michael F. Oglo

(57) ABSTRACT

An information processor is installed onboard a seagoing vessel that has at least one onboard system, e.g., a weapon system, to carry out a mission that is defined by instructions originating at a remote location, e.g., mission data updates (MDU) data. The information processor is programmed to receive unencrypted data related to the mission. A secure communications terminal has a first hardwire connection to a public switched telephone network (PSTN) and a second hardwire connection to the information processor. The secure communications terminal receives encrypted data related to the mission over the first hardwire connection, converts the encrypted data to unencrypted data and supplies the unencrypted data over the second hardwire connection.

10 Claims, 1 Drawing Sheet

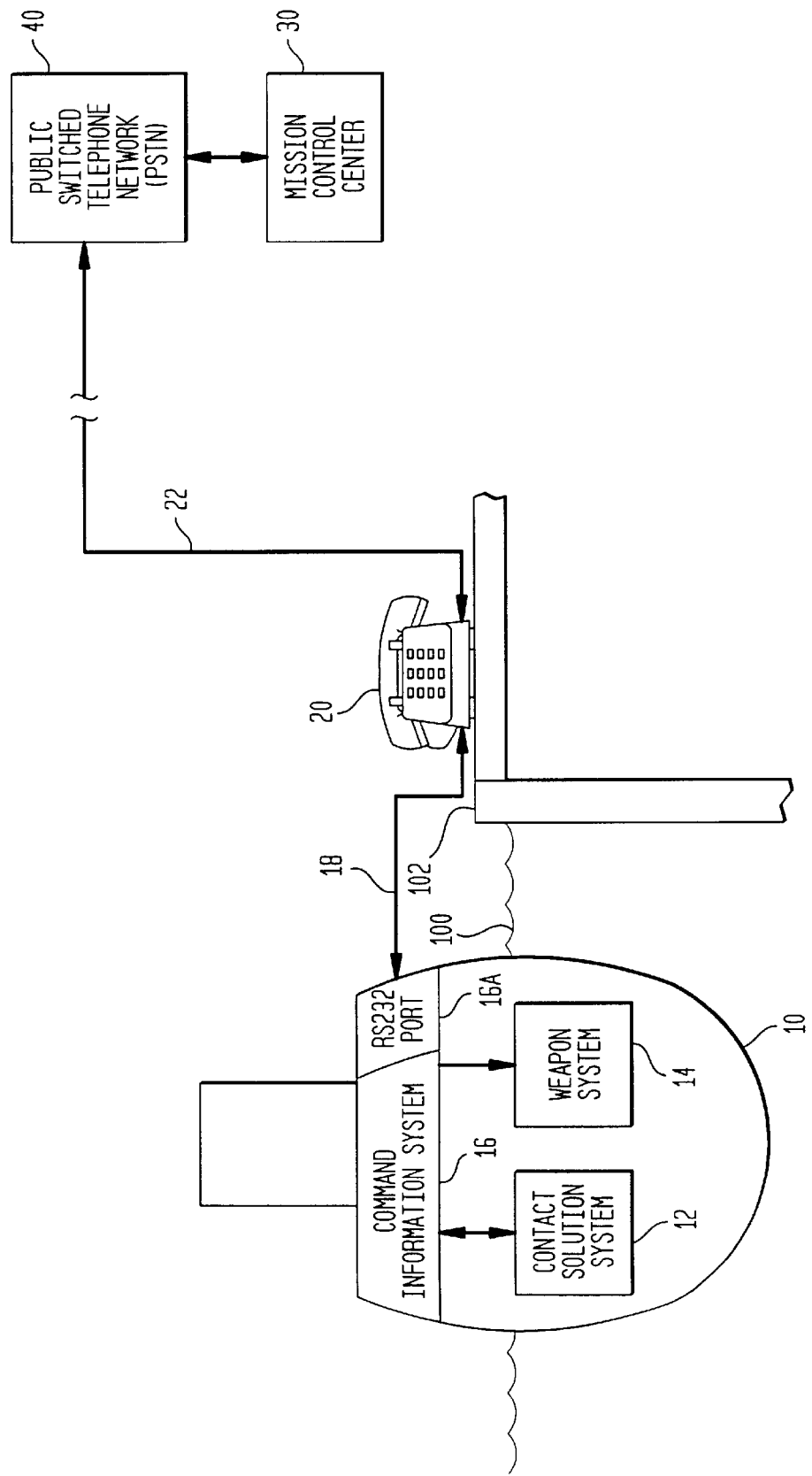

SYSTEM FOR TRANSFER OF SECURE MISSION DATA

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to the transfer of data to seagoing vessels, and more particularly to a system for the transfer of secure mission data over commercial phone lines to a seagoing vessel that is in port.

(2) Description of the Prior Art

The current geo-political conditions and a decreasing defense budget mandate a variety of mission changes for the United States Navy. One such mission change is the requirement that submarines operate as part of battle groups. This means that submarines will now be spending more time in port with their assigned battle group instead of patrolling the ocean waters independently of all other sea/air traffic.

The change in submarine mission has led to a revaluation of a variety of submarine tasks such as communication therewith from land-based systems. For example, mission data updates (hereinafter designated as MDU) have traditionally been transmitted via a satellite network for receipt by a submarine's radio antenna mounted in its sail. However, this requires the submarine's radio room to be operational. While this is standard procedure at sea, operation of the radio room when in port is unnecessary. In addition, the number of applications competing for "air time" on the satellite network is ever increasing thereby causing delays in receiving MDU data from land-based systems or in transmitting data from the submarine to land-based systems. This problem is further exacerbated as the amount of MDU data that must be transferred for certain applications increases.

SUMMARY OF THE INVENTION

Accordingly, it is an object of the present invention to provide a system that can transfer MDU data to a submarine without relying on the satellite network.

Another object of the present invention is to provide a system that can transfer MDU data to a submarine in port without requiring the submarine's radio room to be operational.

Other objects and advantages of the present invention will become more obvious hereinafter in the specification and drawings.

In accordance with the present invention, a communications system includes an information processor installed onboard a seagoing vessel. The vessel has at least one onboard system, e.g., a weapon system, for carrying out a mission that is defined by instructions originating at a remote location, e.g., MDU data. The information processor is programmed to receive unencrypted data related to the mission. A secure communications terminal has a first hardwire connection to a public switched telephone network (PSTN) and a second hardwire connection to the information processor. The secure communications terminal receives encrypted data related to the mission over the first hardwire connection, converts the encrypted data to unencrypted data and supplies the unencrypted data over the second hardwire connection.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

The sole FIGURE is a schematic view of an embodiment of the communications system of the present invention configured for a U.S. Navy Seawolf class submarine.

DESCRIPTION OF THE PREFERRED EMBODIMENT(S)

By way of illustrative example, a system for the secure transfer of mission data updates (MDU) according to the present invention will be described for a U.S. Navy Seawolf class submarine. However, the present invention can be adapted for use with other vessels receiving mission directives from a remote location. Referring to the sole FIGURE, the relevant portions of a Seawolf class submarine 10 for the present invention are shown schematically while submarine 10 is floating at the surface of the sea 100 in port alongside a dock 102.

Submarine 10 includes an onboard contact solution system 12, an onboard weapon system 14 and a command information system 16. Briefly, contact solution system 12 is representative of one or more sensor systems (not shown) and processing circuitry (not shown) that cooperate to generate solutions (e.g., range, speed, bearing, etc.) related to contacts encountered by submarine 10 while at sea. Weapon system 14 is representative of one or more weapon systems (e.g., missiles, torpedoes, etc.) that get their targets or mission directives from a remote location. Typically, the remote location is a land-based mission control center 30. Command information system 16 is representative of an onboard processing system that is designed/programmed to receive data related to the mission directives from mission control center 30 and to transmit contact solution data generated by contact solution system 12. For example, command information system 16 is the Joint Maritime Command Information System (JMCIS) in the Seawolf class submarines.

In the past, such receipt and transmission of data has occurred over a satellite network as described above. However, by virtue of the present invention, standard commercial phone lines can be used to link mission control center 30 to submarine 10. More specifically, mission control center 30 is directly connected or hardwired to a public switched telephone network (PSTN) 40. A communications terminal 20 is also directly connected or hardwired to PSTN 40 and hardwired to command information system 16 as will be described further below.

Since security is generally a concern for contact solution data and mission data, and since PSTN 40 is a commercial network, it will be assumed that data passing between mission control center 30 and communications terminal 20 is encrypted. Decryption can take place, for example, at communications terminal 20 which can be realized by a secure communications terminal such as the U.S. Government's Secure Terminal Unit-III (STU-III). An STU-III includes a standard telephone jack port 20A and an RS232 compatible port 20B. Port 20A is hardwired to PSTN 40 via telephone cable 22 and port 20B is hardwired to command information system 16 via an RS232 cable 18. Briefly, the STU-III receives/transmits encrypted data via telephone jack port 20A and transmits/receives unencrypted data via RS232 compatible port 20B. Decryption or encryption of data is accomplished by the STU-III depending a on the direction of data travel.

RS232 cable 18 must be interfaced to command information system 16. For example, with respect to the Seawolf class submarine's JMCIS, RS232 cable 18 can be connected to an RS232 port 16A provided on command information system 16. However, command information system 16 must be programmed to recognize such a connection. This can be accomplished via software. For example, in terms of the JMCIS, port 16A is realized by an RS232 compatible serial port available on a Generic Front End Communications Processor (GFCP) card (not shown). Control of the input/output features of the GFCP to support such a connection to terminal 20 is accomplished via the GFCP control window software which is available on certain display consoles of the Seawolf class submarine.

In operation, encrypted MDU data is transmitted from mission control center 30 over PSTN 40 to secure communications terminal 20. The MDU data is decrypted and the resulting unencrypted data is passed to command information system 16 serially via RS232 cable 18. The present invention can also be operated in reverse. That is, contact solution data can be passed in its unencrypted form over RS232 cable 18 to terminal 20 where it is encrypted for transmission to mission control center 30 (or other locations) connected to PSTN 40.

The advantages of the present invention are numerous. A vessel (e.g., submarine) in port can receive or transmit secure data using standard commercial phone lines. This obviates the need to operate the vessel's radio control room in port. Further, delays associated with utilizing the satellite network for the transmission of MDU data is eliminated.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A communications system, comprising:
   an information processor installed onboard a seagoing vessel having at least one onboard system for carrying out a mission wherein said mission is defined by instructions originating at a remote location, said information processor programmed to receive unencrypted data related to said mission; and
   a secure communications terminal having a first hardwire connection to a public switched telephone network (PSTN) and a second hardwire connection to said information processor, said secure communications terminal receiving encrypted data related to said mission over said first hardwire connection, converting said encrypted data to said unencrypted data and supplying said unencrypted data over said second hardwire connection.

2. A communications system as in claim 1 wherein said second hardwire connection is RS232 compatible.

3. Communications system as in claim 1 wherein said secure communications terminal is a STU-III terminal.

4. A communications system, comprising:
   an information processor installed onboard a seagoing vessel having a weapon system for carrying out a mission wherein said mission is defined by instructions originating at a remote location, said information processor having an RS232 compatible interface for receiving unencrypted data related to said mission;
   an RS232 cable having a first end coupled to said RS232 compatible interface of said information processor and having a second end; and
   a secure communications terminal having a hardwire connection to a public switched telephone network (PSTN) and an RS232 compatible terminal coupled to said second end of said RS232 cable, said secure communications terminal receiving encrypted data related to said mission over said hardwire connection, converting said encrypted data to said unencrypted data and transmitting said unencrypted data over said RS232 cable.

5. A communications system as in claim 4 wherein said secure communications terminal is a STU-III terminal.

6. A system, comprising:
   a seagoing vessel having a contact solution system for generating solution data relating to encountered contacts;
   a weapon system in said seagoing vessel capable of receiving a mission, wherein said mission is defined by instructions originating at a remote location;
   an information processor installed onboard said seagoing vessel and coupled to said contact solution system and said weapon system, said information processor programmed to receive unencrypted data related to said mission and programmed to transmit said solution data to said weapon system; and
   a secure communications terminal having a first hardwire connection to a public switched telephone network (PSTN) and a second hardwire connection to said information processor, said secure communications terminal receiving encrypted data related to said mission over said first hardwire connection, converting said encrypted data to said unencrypted data and supplying said unencrypted data over said second hardwire connection, said secure communications terminal further receiving said solution data over said second hardwire connection, converting said solution data to encrypted solution data and transmitting said encrypted solution data over said first hardwire connection.

7. A communications system as in claim 6 wherein said second hardwire connection is RS232 compatible.

8. A communications system as in claim 6 wherein said secure communications terminal is a STU-III terminal.

9. A communications system as in claim 6 wherein said information processor is a Joint Maritime Command Information System (JMCIS) having a Generic Front End Communications Processor (GFCP) card installed therein.

10. A communications system as in claim 9 wherein said JMCIS information processor is connected to said secure information terminal by an RS232 cable and wherein said RS232 cable is connected to the JMCIS by an RS232 compatible serial port available on said JMCIS.

* * * * *